United States Patent
El-Maleh et al.

(10) Patent No.: US 9,502,909 B2
(45) Date of Patent: Nov. 22, 2016

(54) POWER MANAGEMENT FOR ELECTRONIC DEVICES

(75) Inventors: Khaled Helmi El-Maleh, San Marcos, CA (US); Yair Karmi, San Diego, CA (US); Sandip S. Minhas, San Diego, CA (US); Srinivas Raghavan, San Diego, CA (US); Peng Li, San Diego, CA (US); David Maldonado, Chula Vista, CA (US); MaryBeth Selby, San Jose, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 12/854,850

(22) Filed: Aug. 11, 2010

(65) Prior Publication Data

US 2011/0115432 A1 May 19, 2011

Related U.S. Application Data

(60) Provisional application No. 61/262,119, filed on Nov. 17, 2009.

(51) Int. Cl.
| | |
|---|---|
| *H02J 7/00* | (2006.01) |
| *G06Q 30/02* | (2012.01) |
| *G06Q 30/06* | (2012.01) |
| *H02J 7/02* | (2016.01) |
| *H02J 7/04* | (2006.01) |

(Continued)

(52) U.S. Cl.
CPC ......... *H02J 7/0004* (2013.01); *G06Q 30/0267* (2013.01); *G06Q 30/0601* (2013.01); *H02J 7/025* (2013.01); *H02J 7/041* (2013.01); *H02J 17/00* (2013.01); *H04B 5/0037* (2013.01)

(58) Field of Classification Search
CPC .......... H02J 7/0004; H02J 7/041; H02J 7/025; H02J 17/00
USPC ......................... 320/107, 108, 114, 132, 134
See application file for complete search history.

(56) References Cited

U.S. PATENT DOCUMENTS

| | | |
|---|---|---|
| 3,938,018 A | 2/1976 | Dahl |
| 6,031,354 A | 2/2000 | Wiley et al. |
| 6,493,437 B1 | 12/2002 | Olshansky |

(Continued)

FOREIGN PATENT DOCUMENTS

| | | |
|---|---|---|
| AU | 2006249578 A1 | 11/2006 |
| CN | 1836348 A | 9/2006 |

(Continued)

OTHER PUBLICATIONS

International Search Report and Written Opinion—PCT/US2010/057117, ISA/EPO—May 17, 2011.

(Continued)

*Primary Examiner* — Edward Tso
*Assistant Examiner* — Aaron Piggush
(74) *Attorney, Agent, or Firm* — Knobbe, Martens, Olson & Bear, LLP

(57) ABSTRACT

Exemplary embodiments are directed to wireless power management. A method may include detecting one or more wireless chargers for charging an energy storage device of one or more monitored energy storage devices if the energy storage device drops below a threshold value. Moreover, the method may include selecting a charging scheme for an electronic device associated with the energy storage device.

38 Claims, 11 Drawing Sheets

(51) Int. Cl.
  *H02J 17/00* (2006.01)
  *H04B 5/00* (2006.01)

(56) References Cited

U.S. PATENT DOCUMENTS

| | | | |
|---|---|---|---|
| 7,502,619 B1 | 3/2009 | Katz | |
| 8,154,246 B1* | 4/2012 | Heitmann | 320/109 |
| 8,169,185 B2* | 5/2012 | Partovi et al. | 320/108 |
| 2002/0077130 A1 | 6/2002 | Owensby | |
| 2002/0087335 A1 | 7/2002 | Meyers et al. | |
| 2003/0013434 A1 | 1/2003 | Rosenberg et al. | |
| 2003/0034757 A1 | 2/2003 | Woodnorth | |
| 2004/0017181 A1 | 1/2004 | Sakai | |
| 2004/0111360 A1 | 6/2004 | Albanese | |
| 2005/0038614 A1 | 2/2005 | Botts et al. | |
| 2006/0113955 A1 | 6/2006 | Nunally | |
| 2006/0133003 A1 | 6/2006 | Kular et al. | |
| 2006/0182074 A1 | 8/2006 | Kubler et al. | |
| 2006/0184705 A1 | 8/2006 | Nakajima | |
| 2006/0287763 A1* | 12/2006 | Ochi et al. | 700/231 |
| 2007/0072474 A1 | 3/2007 | Beasley et al. | |
| 2007/0274226 A1 | 11/2007 | Tillotson | |
| 2008/0116847 A1 | 5/2008 | Loke et al. | |
| 2008/0122518 A1 | 5/2008 | Besser et al. | |
| 2008/0157603 A1 | 7/2008 | Baarman et al. | |
| 2008/0197802 A1 | 8/2008 | Onishi et al. | |
| 2008/0210762 A1 | 9/2008 | Osada et al. | |
| 2008/0221986 A1 | 9/2008 | Soicher et al. | |
| 2008/0235332 A1 | 9/2008 | McChesney et al. | |
| 2008/0249873 A1 | 10/2008 | Seelinger | |
| 2008/0265835 A1 | 10/2008 | Reed et al. | |
| 2008/0305775 A1 | 12/2008 | Aaltonen et al. | |
| 2009/0058361 A1 | 3/2009 | John | |
| 2009/0106137 A1 | 4/2009 | Ochi et al. | |
| 2009/0111492 A1 | 4/2009 | Dudley et al. | |
| 2009/0119039 A1 | 5/2009 | Banister et al. | |
| 2009/0128086 A1 | 5/2009 | Lee | |
| 2009/0133733 A1 | 5/2009 | Retti | |
| 2009/0156268 A1* | 6/2009 | Kim et al. | 455/573 |
| 2009/0215473 A1 | 8/2009 | Hsu | |
| 2009/0243397 A1 | 10/2009 | Cook et al. | |
| 2009/0251309 A1 | 10/2009 | Yamasuge | |
| 2009/0327150 A1 | 12/2009 | Flake et al. | |
| 2010/0034238 A1 | 2/2010 | Bennett | |
| 2010/0036773 A1 | 2/2010 | Bennett | |
| 2010/0167765 A1 | 7/2010 | Sarmah et al. | |
| 2010/0171461 A1 | 7/2010 | Baarman et al. | |
| 2010/0174629 A1 | 7/2010 | Taylor et al. | |
| 2010/0201314 A1 | 8/2010 | Toncich et al. | |
| 2010/0223136 A1 | 9/2010 | Wormald et al. | |
| 2010/0223641 A1 | 9/2010 | Hubbard | |
| 2010/0253281 A1 | 10/2010 | Li | |
| 2010/0256831 A1 | 10/2010 | Abramo et al. | |
| 2010/0276995 A1 | 11/2010 | Marzetta et al. | |
| 2010/0323616 A1 | 12/2010 | Von Novak et al. | |
| 2011/0043327 A1 | 2/2011 | Baarman et al. | |
| 2011/0082727 A1 | 4/2011 | Macias | |
| 2011/0099065 A1 | 4/2011 | Georgis et al. | |
| 2011/0115431 A1 | 5/2011 | Dunworth et al. | |
| 2011/0119135 A1 | 5/2011 | Grilli et al. | |
| 2011/0119144 A1 | 5/2011 | Grilli et al. | |
| 2012/0016748 A1 | 1/2012 | Aaltonen et al. | |
| 2012/0214536 A1 | 8/2012 | Kim et al. | |

FOREIGN PATENT DOCUMENTS

| | | |
|---|---|---|
| CN | 1881674 A | 12/2006 |
| CN | 101056456 A | 10/2007 |
| CN | 101136556 A | 3/2008 |
| CN | 101136561 A | 3/2008 |
| CN | 101383435 A | 3/2009 |
| CN | 101447684 A | 6/2009 |
| CN | 101459984 A | 6/2009 |
| CN | 101520878 A | 9/2009 |
| CN | 101645618 A | 2/2010 |
| EP | 1528652 | 5/2005 |
| EP | 1667308 A2 | 6/2006 |
| EP | 1734635 A2 | 12/2006 |
| EP | 2071695 A2 | 6/2009 |
| FR | 2879852 | 6/2006 |
| GB | 2438485 A | 11/2007 |
| JP | H06133476 A | 5/1994 |
| JP | H0879984 A | 3/1996 |
| JP | H0918930 A | 1/1997 |
| JP | 09046282 | 2/1997 |
| JP | 2001025104 A | 1/2001 |
| JP | 2001136684 A | 5/2001 |
| JP | 2001298511 A | 10/2001 |
| JP | 2001359166 A | 12/2001 |
| JP | 2002077464 A | 3/2002 |
| JP | 2002135375 A | 5/2002 |
| JP | 2002534827 A | 10/2002 |
| JP | 2002359008 A | 12/2002 |
| JP | 2003091629 A | 3/2003 |
| JP | 2003299255 A | 10/2003 |
| JP | 2003348757 A | 12/2003 |
| JP | 2004050383 A | 2/2004 |
| JP | 2004056555 A | 2/2004 |
| JP | 2004128827 A | 4/2004 |
| JP | 2004258876 A | 9/2004 |
| JP | 2005505997 A | 2/2005 |
| JP | 2005110421 A | 4/2005 |
| JP | 2006160256 A | 6/2005 |
| JP | 2005261187 A | 9/2005 |
| JP | 2005328662 A | 11/2005 |
| JP | 2006517378 A | 7/2006 |
| JP | 2006353042 A | 12/2006 |
| JP | 2007114968 A | 5/2007 |
| JP | 2007180195 A | 7/2007 |
| JP | 2007526730 A | 9/2007 |
| JP | 2007274372 A | 10/2007 |
| JP | 2007288940 A | 11/2007 |
| JP | 2007295192 A | 11/2007 |
| JP | 2008021042 A | 1/2008 |
| JP | 2008206233 A | 9/2008 |
| JP | 2008236680 A | 10/2008 |
| JP | 2008295191 A | 12/2008 |
| JP | 2009037044 A | 2/2009 |
| JP | 2009523402 A | 6/2009 |
| JP | 2009148151 A | 7/2009 |
| JP | 2009183135 A | 8/2009 |
| JP | 2009253763 A | 10/2009 |
| JP | 2010515425 A | 5/2010 |
| JP | 2010152633 A | 7/2010 |
| JP | 2010525785 A | 7/2010 |
| TW | I268429 | 12/2006 |
| TW | 200824215 A | 6/2008 |
| TW | I302245 | 10/2008 |
| TW | 200917611 A | 4/2009 |
| TW | 200941889 A | 10/2009 |
| WO | WO0039908 A1 | 7/2000 |
| WO | WO0054387 | 9/2000 |
| WO | WO03047064 A2 | 6/2003 |
| WO | WO2004114433 | 12/2004 |
| WO | WO-2006067350 A1 | 6/2006 |
| WO | WO2006127185 A2 | 11/2006 |
| WO | WO-2008133806 A1 | 11/2008 |
| WO | WO2008137996 A1 | 11/2008 |
| WO | 2009014125 A1 | 1/2009 |
| WO | WO2009009559 | 1/2009 |
| WO | WO-2009047769 A2 | 4/2009 |
| WO | WO-2009111597 A2 | 9/2009 |
| WO | WO2010036980 A1 | 4/2010 |
| WO | WO2010118161 | 10/2010 |
| WO | WO2011063054 | 5/2011 |

OTHER PUBLICATIONS

International Search Report and Written Opinion13 PCT/US2010/057118—ISA/EPO—Apr. 27, 2011.
International Search Report and Written Opinion—PCT/US2010/057121, ISA/EPO—May 13, 2011.

(56) References Cited

OTHER PUBLICATIONS

International Search Report and Written Opinion—PCT/US2010/057122—ISA/EPO—May 23, 2011.
Robinson, Stuart. "Wireless Charging Will Quadruple Potential Combined Speed Charging" (Strategy Analytics, Inc.) Jul. 28, 2009.
Taiwan Search Report—TW099139578—TIPO—Nov. 5, 2013.
Anhiroshi K., "CES 2009—3D Games and Non-Contact Charging Base Appeared in the Annual Two Days before the Event," Jan. 8, 2009, 6 pages. Retrieved from the internet: URL: http://news.mynavi.jp/articles/2009/01/08/ces01/>.
Taiwan Search Report—TW104111837—TIPO—Dec. 1, 2015.
Frost & Sullivan: "Wireless Power: The next wave in powering electronic devices", Feb. 24, 2009, M2 Presswire, p. 3 Retrieved from http://search.proquest.com/docview/444334993?accountid=14753.

\* cited by examiner

POWER MANAGEMENT FOR ELECTRONIC DEVICES

CLAIM OF PRIORITY UNDER 35 U.S.C. §119

This application claims priority under 35 U.S.C. §119(e) to:

U.S. Provisional Patent Application No. 61/262,119 entitled "WIRELESS POWER" filed on Nov. 17, 2009, the disclosure of which is hereby incorporated by reference in its entirety.

BACKGROUND

1. Field

The present invention relates generally to wireless power, and more specifically, to power management, location of wireless chargers, and automated wireless charging.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for systems, devices, and methods for managing power associated with electronic devices, locating wireless power chargers, and automated wireless charging.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors. It is noted that the present invention may be applicable to any suitable wireless power scenarios, such as near-field, far-field, resonant, and inductive coupling.

Figure 1:
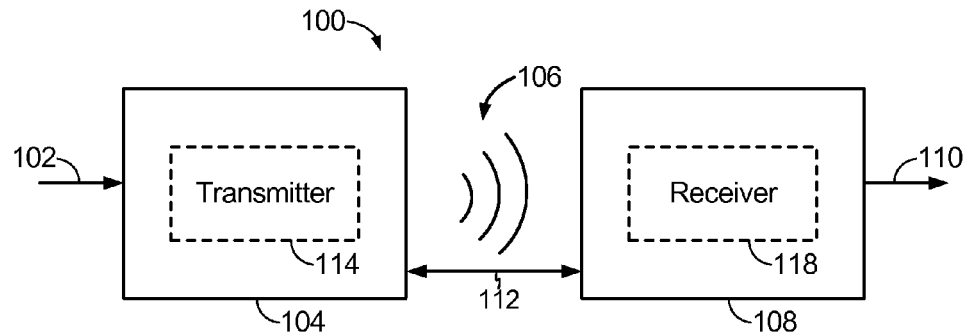
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
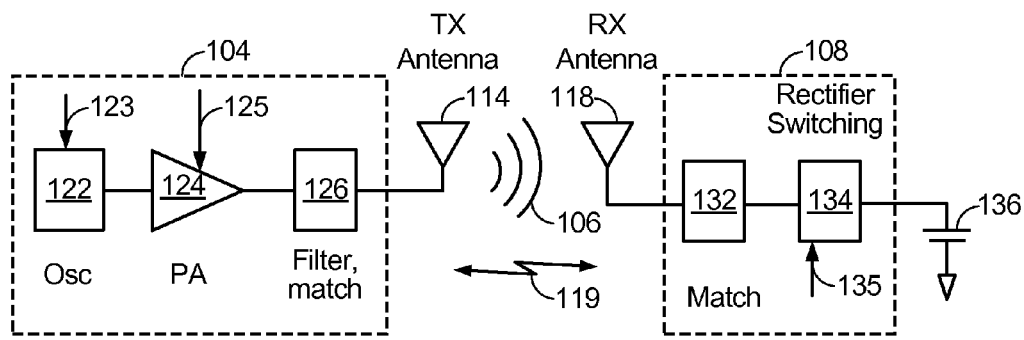
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
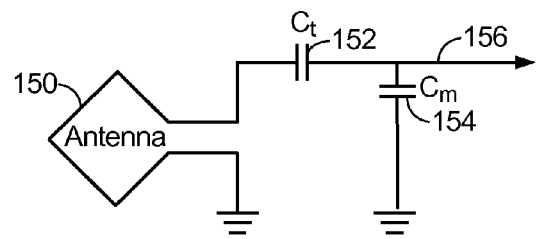
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
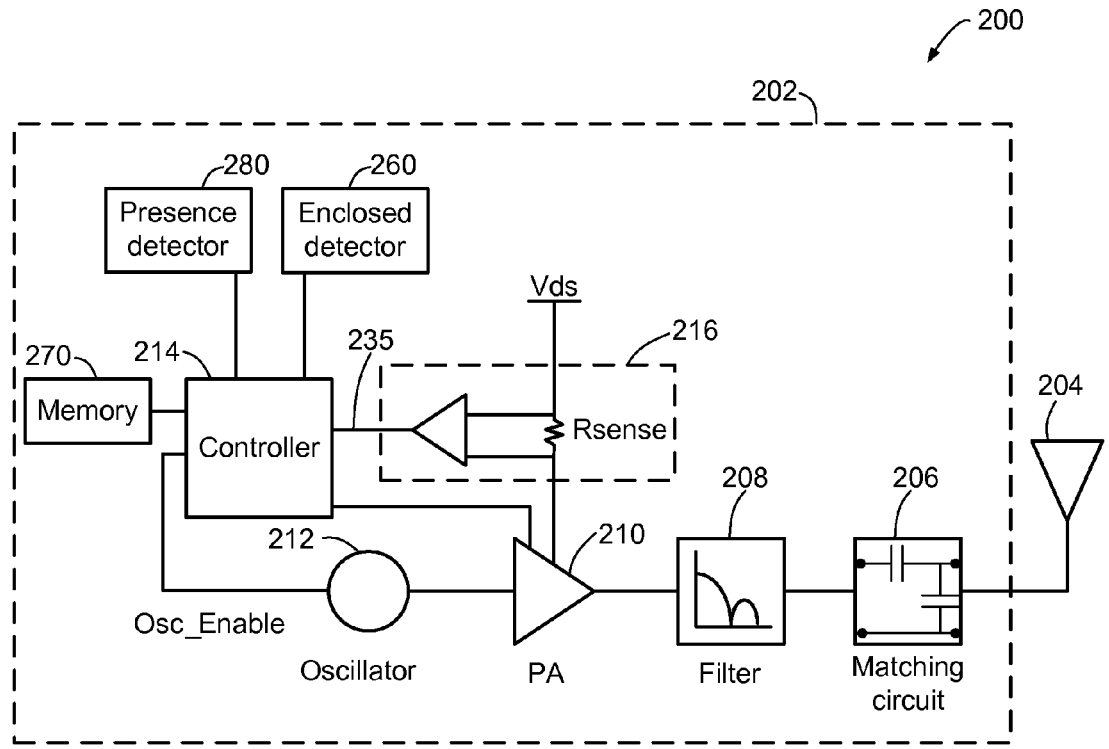
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example only, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
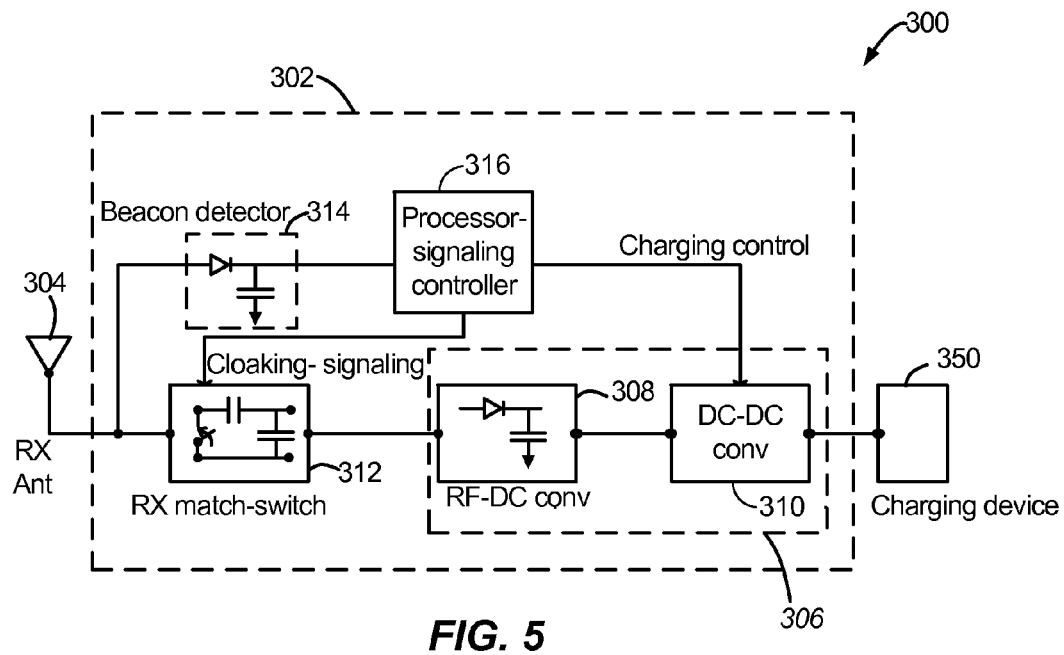
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
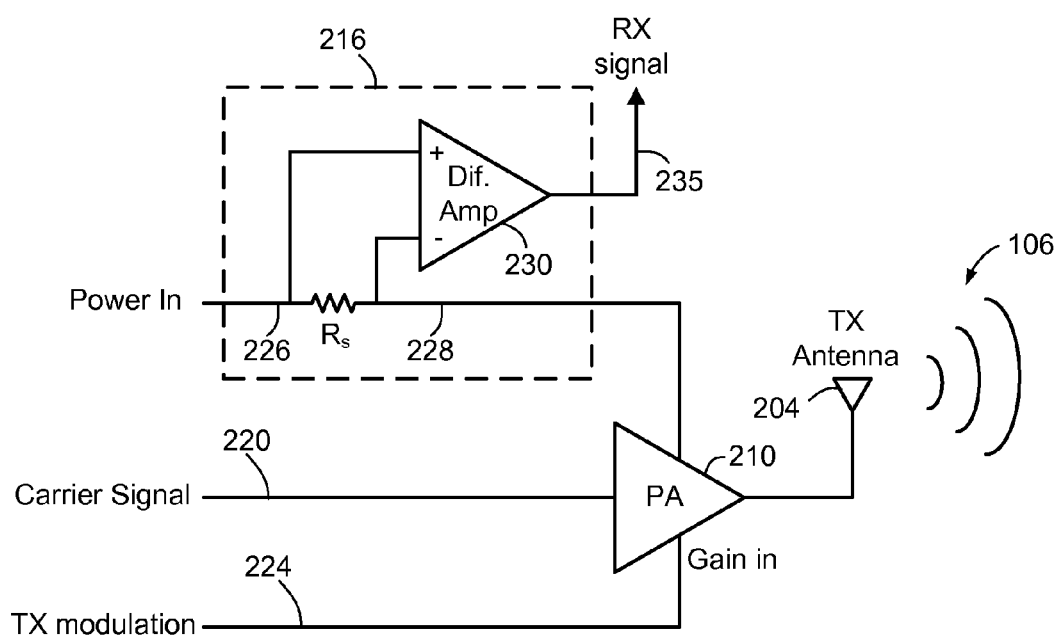
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Figure 7:
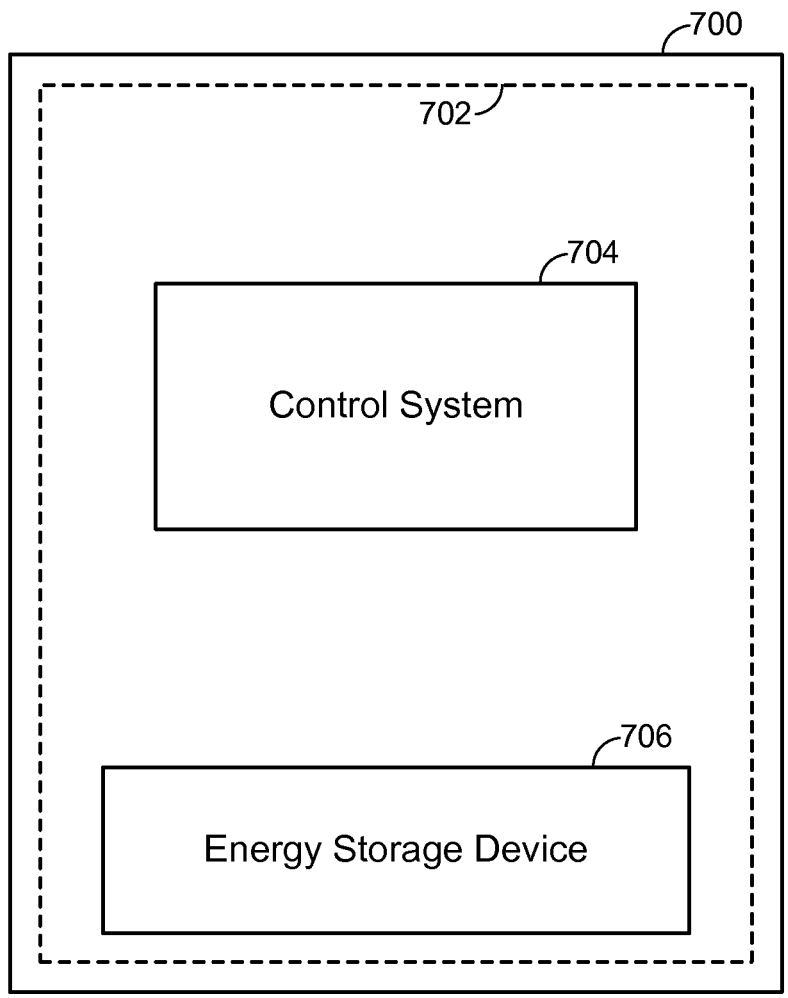
FIG. 7 illustrates an electronic device including a control system, according to an exemplary embodiment of the present invention.

Various exemplary embodiments of the present invention relate to power management of one or more electronic devices, location of wireless chargers, and automated wireless charging. FIG. 7 illustrates an electronic device 700 having a receiver (not shown in FIG. 7; see e.g., receiver 300 of FIG. 5) and at least one associated receive antenna 702. Electronic device 700 may further include a control system 704 and an energy storage device 706. By way of example only, energy storage device 706 may comprise a battery. As described herein, control system 704 may be configured for power management as well as wireless charging of device 700.

It is noted that although control system 704 is illustrated as being associated with a single electronic device (i.e., device 700), the present invention is not so limited. Rather, according to one exemplary embodiment, control system 704 may be distributed in several associated electronic devices. For example, a user may have a plurality of devices (e.g., a mobile telephone, a personal media player, and a Bluetooth headset), wherein control system 704 is disturbed in each device and configured to manage power consumption and wireless charging for each of the plurality of devices.

Figure 8:
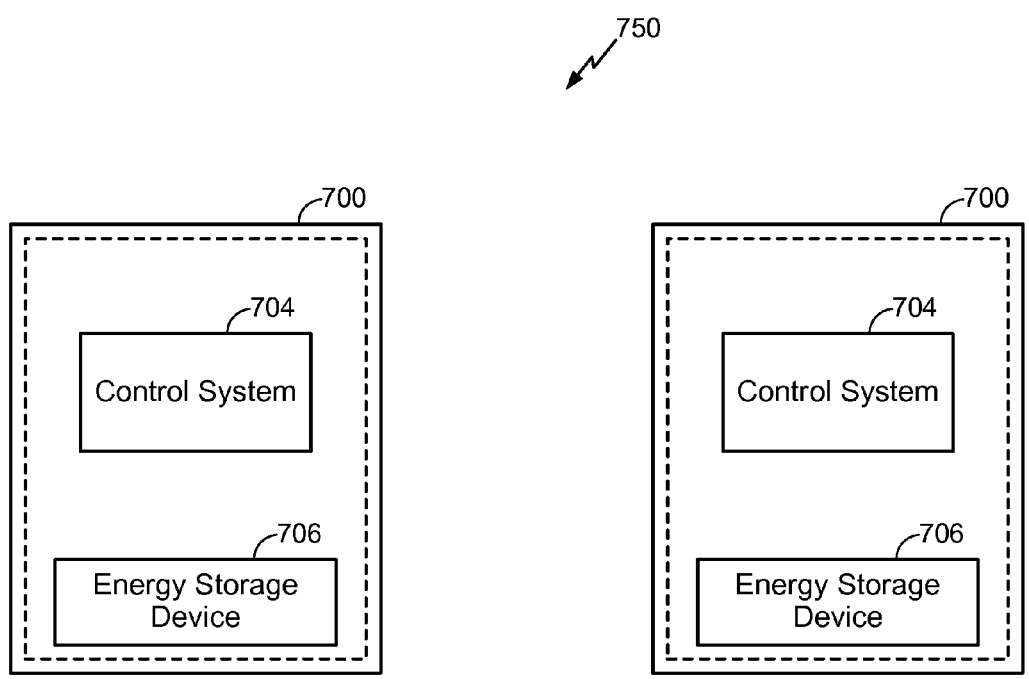
FIG. 8 illustrates a system comprising a plurality of electronic devices, in accordance with an exemplary embodiment of the present invention.

FIG. 8 illustrates a system 750 comprising a plurality of devices 700, wherein each device comprises control system 704. As a more specific example, with reference to FIG. 8, one device 700 may comprise a user's mobile telephone and another device 700 may comprise the user's portable media player. According to another exemplary embodiment described more fully below with reference to FIG. 10, control system 704 may reside on a server-based device and may be configured for managing power consumption and wireless charging of a plurality of associated wirelessly chargeable electronic devices.

With reference again to FIG. 7, according to one exemplary embodiment, a level of charge stored within energy storage device 706 may be monitored. By way of example only, control system 704 may be configured to determine and monitor a level of charge stored within energy storage device 706. Moreover, control system 704 may be configured to search for and possibly locate one or more suitable wireless chargers positioned within a detectable region and configured for transmitting wireless power. More specifically, for example, upon a charging level of energy storage device 706 dropping below a threshold amount, control system 704 may be configured to attempt to locate one or more suitable wireless chargers.

Figure 9:
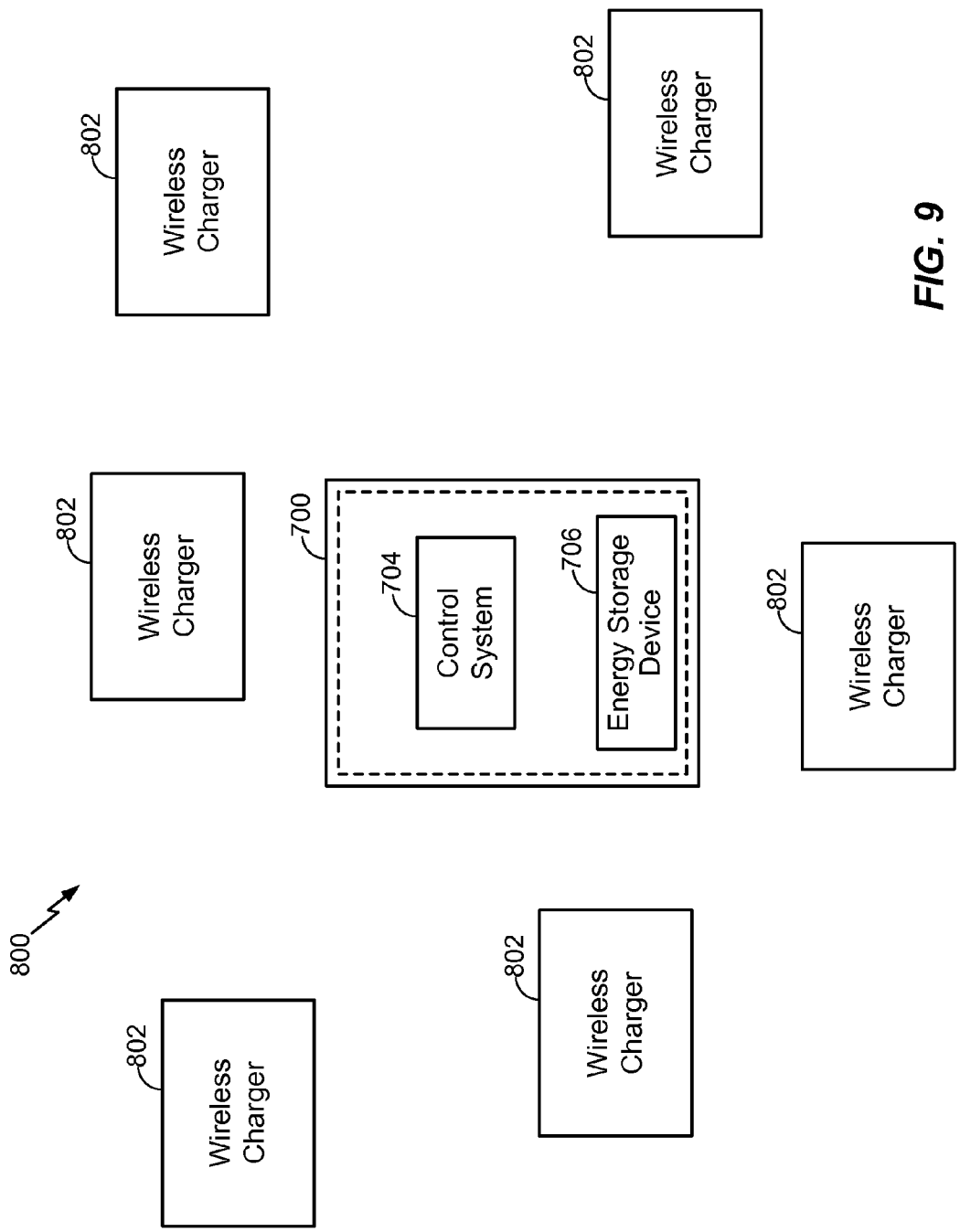
FIG. 9 illustrates a system including an electronic device and a plurality of wireless chargers, in accordance with an exemplary embodiment of the present invention.

FIG. 9 illustrates a system 800 including electronic device 700 and a plurality of wireless chargers 802, which are positioned within a detectable region of device 700. Accordingly, as noted above, electronic device 700 and, more specifically, control system 704, may be configured to search for and identify wireless chargers 802. It is noted that one or more wireless chargers 802 may comprise a chargeable device, such as a portable media player. Accordingly, device 700, which in one example comprises a mobile telephone, may receive ("scavenge") power from another device (i.e., a portable media player).

As noted above, control system 704 may be configured to detect one or more wireless chargers positioned within a detectable region. By way of example only, control system 704 may comprise, or may be coupled to, one or more proximity sensors configured for detecting wireless chargers. According to another exemplary embodiment, control system 704 may comprise, or may be operably coupled to, a Global Positioning System (GPS), which may assist device 700 in the search for and the location of one or more suitable wireless chargers. An embodiment wherein control system 704 comprises, or is operably coupled to, a GPS for assisting in the location of one or more wireless chargers will be described more fully below.

Moreover, upon detection of at least one wireless charger 802, control system 704 may further be configured to implement a suitable charging scheme for associated device 700. More specifically, control system 704 may employ a charging analysis to determine, based on one or more factors, whether to receive a charge from an available wireless charger. A charging analysis may include analyzing or more factors, as described more fully below. For example, a charging analysis may comprise, for example only, a cost benefit analysis wherein the cost of charging is weighed against the benefit of charging. Furthermore, in the event a plurality of wireless chargers are detected by control system 704, control system 704 may be configured to determine, based on one or more factors, which wireless charger of the plurality of identified wireless chargers to receive a charge from to enable a charging scenario of device 700 to be optimized. Yet even more specifically, control system 704 may consider various factors associated with device 700, with a user of device 700, one or more available wireless chargers, or a combination thereof, and, in response thereto, may determine whether to receive a charge and, if so, what wireless charger to receive a charge from to enable a charging scenario of device 700 to be optimized. It is noted that upon selecting one or more wireless charger to be utilized for a charging scheme, device 700 and the one or more selected wireless chargers may engage in any suitable authentication process using one or more known and suitable protocols (e.g., hand shaking protocols).

By way of example only, factors that may be considered in a charging analysis may include a level of charge of device 700, an amount of charge required by device 700, an operational state of device 700, the cost of charging device 700, the benefit of charging device 700, delays associated with charging device 700, reliability issues associated with one or more available wireless chargers, expected length of time for charging device 700, expected time until a subsequent charge of device 700, power demand of device 700, and applications being employed by device 700.

It is noted that the term "charging scheme" may comprise a "no-charge scheme." Stated another way, control system 704 may implement a suitable charging scheme for an associated device by deciding not to charge the device. Furthermore, control system 704 may implement a suitable charging scheme for an associated device by deciding to charge the device, and furthermore, deciding which wireless charger to utilize for the charging.

As noted above, upon control system 704 identifying at least one available wireless charger, control system 704 may consider one or more factors in determining whether to receive a wireless charge and, if so, from what wireless charger. As will be appreciated by a person having ordinary skill in the art, various wireless chargers (e.g., public wireless power hotspots) may require a user to pay a surcharge (i.e., subscription-based charging) or purchase a product (e.g., a cup of coffee) before receiving a charge therefrom. Such fees may be undesirable to a user if free charging is also available nearby. Similar to subscription-based charging, advertisement-based charging may allow a user to charge for free after viewing at least one advertisement. Again, this may be undesirable to a user if the user can charge somewhere else without viewing advertisements.

Charging speed may also be important in choosing a wireless charger. Several factors could affect the speed of transmission, such as the number of devices charging at one time. If the speed of transmission is relatively low, a user may prefer a faster source, even if a fee is required. In addition, there are several factors that may affect a user's desire to charge at a particular time, including whether the user is stationary or in motion, and the remaining battery life of the device. Charging devices while moving may be difficult and, thus, a user may prefer to charge a device after reaching a destination. Moreover, if the remaining life of the battery is nearly full and all surrounding wireless power chargers are unsatisfactory for some reason (e.g., all charge a fee), a user may prefer to wait to charge the device. Accordingly, control system 704 may be configured to consider one or more factors associated with identified chargers (i.e., whether a charger is a fee-based charger, whether a charger is an advertisement-based charger, and a charging speed of a charger) in order to determine which wireless charger to select for charging.

According to one exemplary embodiment, control system 704 may be configured to, upon completion of a charging analysis, automatically implement a charging scheme for device 700. According to another exemplary embodiment, upon completion of a charging analysis, control system 704 may be configured to provide a user of device 700 with a suggested charging scheme, which may be accepted or rejected by the user. It is noted that device 700 may provide a device user with a list of detected wireless chargers. Moreover, device 700 may provide the user with information about the detected wireless chargers, including location, cost, and speed of transmission. Based on the provided information, the user may select a charging scheme (e.g., whether to charge device 700 and, if so, what wireless power charger to utilize). It is noted that according to one exemplary embodiment, device 700 may be configured to delay charging until a device user has selected a desired wireless charger.

In another exemplary embodiment, control system 704 may be configured to employ one or more charging modes. The charging modes may define a charging scheme, such as a "wireless charging mode," a "no-wireless charging mode," a "subscription based charging mode," or an "ad-based charging mode." Control system 704 may be configured to implement a specific charging mode based on several parameters, such as time, location, temporary preference, etc. Moreover, a device user can further define one or more parameters associated with a specific charging mode. Furthermore, switching between charging modes may be automatic, semi-automatic (i.e., proposed to user for approval and switched if there no user override) or manual (i.e., user initiated). According to this exemplary embodiment, for example, a device user may decide to use a subscription-based mode when on campus (i.e., automatic location based)

and an ad-based mode during a specific time period (i.e., time-based) (e.g., between 5 PM and 7 AM). As another example, a user may decide to use only a subscription-based mode in order to avoid advertisements.

According to another exemplary embodiment, control system 704 may be configured to automate exemplary features of the present invention. For example, control system 704 may be configured to employ a probabilistic and/or statistical-based analysis to automatically select a wireless power source or charging mode based on a user's prior decisions. For example, while one user may not mind viewing advertisements in order to receive a wireless charge, another user may prefer to pay for a wireless charge in order to avoid advertisements. As another example, a user may prefer a particular hotspot location or hotspot company. Therefore, control system 704 may be configured to automatically select a charging scheme based on prior preferences of the user.

Additionally, control system 704 may be configured to adapt an operational state of device 700 upon an occurrence of an event. For example, control system 704 may be configured to reduce the power consumption of device 700 if a charging level of an associated energy storage device drops below a threshold value. As another example, control system 704 may be configured to reduce the sensitivity of an associated receiver or reduce a cycle of operation of device 700. Control system 704 may also be configured to shut down or disable one or more applications, such as a GPS.

As will be appreciated by a person having ordinary skill in the art, an electronic device, such as a mobile telephone, may comprise a time management application (i.e., a calendar application). Examples of calendar applications may include Microsoft Outlook, Google Calendars, iCal, and the like. According to one exemplary embodiment of the present invention, control system 704 may be configured to synchronize with an electronic calendar associated with device 700 and, accordingly, control system 704 may predict power demands based on one or more electronic calendar entries. As one example, if a user of device 700 has a conference call scheduled on an associated electronic calendar, control system 704 may be configured to determine, based on the electronic calendar entry, how much battery power may be required for the conference call, and at what time the battery power is needed. Furthermore, if control system 704 determines that a current charging level of device 700 is insufficient for the conference call, control system 700 may search for and possibly locate one or more suitable wireless chargers. As such, energy storage device 706 may be charged prior to the conference call.

Furthermore, control system 704 may be configured to display a message to alert an associated user of device 700 of the need for additional power and a time duration until the power is needed. Control system 704 may alert a user that power is needed, either by wired or wireless means.

Moreover, according to another exemplary embodiment, system 704 may be configured to modify (e.g., reduce) power consumption in anticipation of one or more entries of an associated electronic calendar. For example, after determining, based on a electronic calendar entry (i.e., a conference call), how much battery power may be required for the conference call, system 704 may be configured to reduce the power consumption of device 700 prior to the conference call to conserve power. It is noted that this exemplary embodiment may apply to other scenarios such as, for example only, charging an electronic toothbrush or razor prior to a vacation, charging a laptop computer prior to an educational class, charging a personal media player prior to a daily jog, or charging a remote control prior to a favorite television program.

In one exemplary embodiment, control system 704 may comprise predefined operating parameters. In another exemplary embodiment, a user can customize one or more parameters of control system 704. For example, control system 704 may enable a user to modify criteria for charging based on charging cost, charging threshold, or a combination thereof. Furthermore, control system 704 may enable the user to configure the operations thereof on, for example only, the occurrence of one or more events, at one or more specific times, or any combination thereof. In another example, control system 704 may enable a user to define when control system 704 is enabled or disabled. For example, in order to facilitate privacy concerns, a user may cause control system 704 to disable when the associated device is in certain locations so that other devices cannot detect device 700. As another example, a device user may program a device to act as a wireless charger and may further identify which one or more devices to convey power to. For example, a user may allow only his Bluetooth headset to be charged from his mobile telephone. Stated another way, the Bluetooth headset may scavenge power from the mobile telephone. Similarly, a user may allow a media player to convey power to every other device in possession of the user. As another example, a user may customize control system 704 such that a cellular telephone is refrained from providing power to another device.

Figure 10:
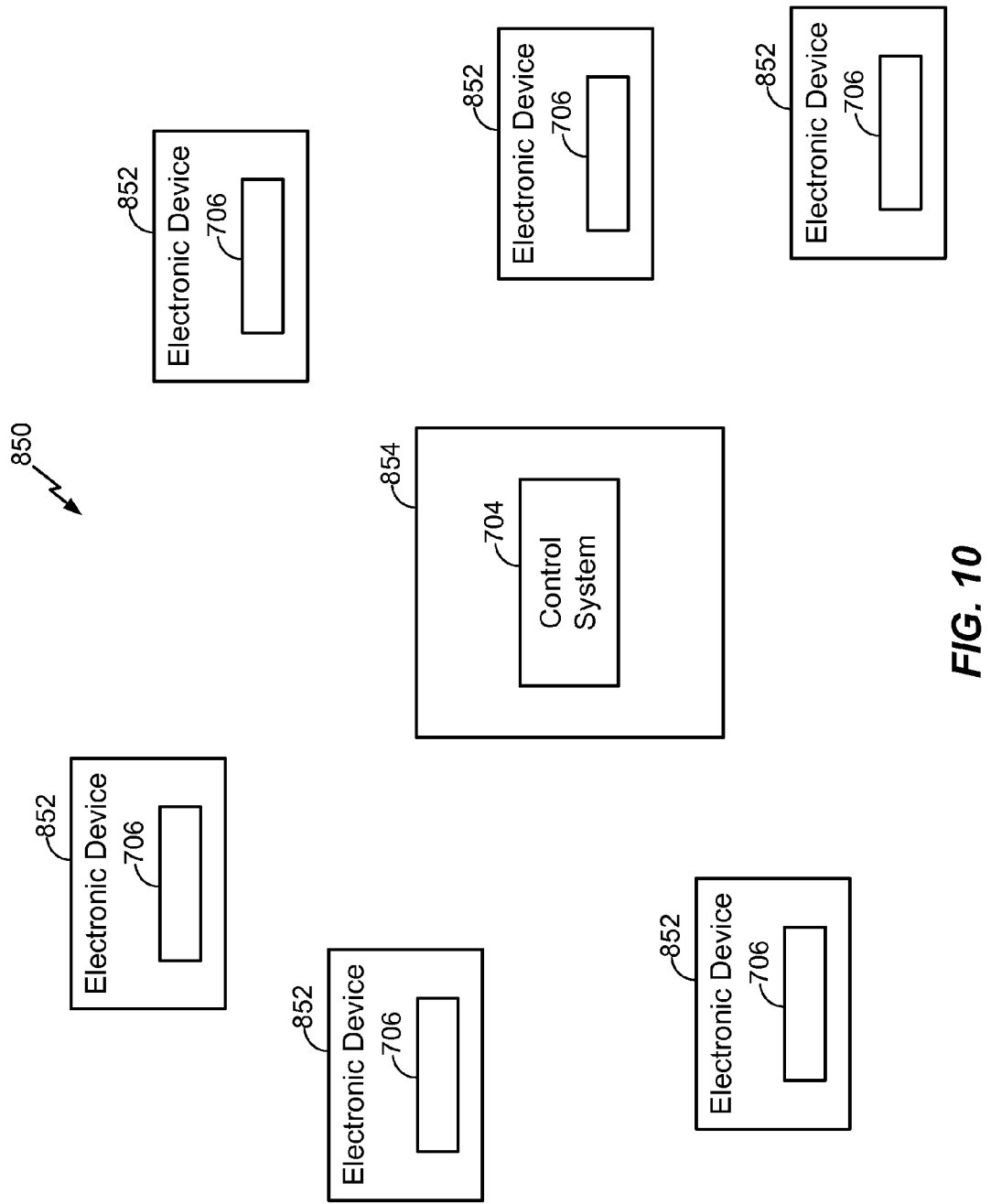
FIG. 10 illustrates a system including a server-based device including a control system, according to an exemplary embodiment of the present invention.

FIG. 10 illustrates a system including a server-based device including a control system, according to an exemplary embodiment of the present invention. With reference to FIG. 10, in accordance with one exemplary embodiment as noted above, control system 704 may reside on a server-based device 854 and may be configured for managing power consumption and wireless charging of a plurality of associated wirelessly chargeable electronic devices 852. More specifically, control system 704 may be configured to monitor a level of charge stored within one or more energy storage devices 706, wherein each energy storage device is associated with a chargeable electronic device 852. Moreover, control system 704 may be configured to search for and possibly locate one or more suitable wireless chargers. More specifically, for example, upon a charging level of an energy storage device 706 dropping below a threshold amount, control system 704 may be configured to attempt to locate one or more suitable wireless chargers for the associated device 852.

According to one exemplary embodiment, control system 704 may be configured to detect one or more wireless chargers, which may be available for charging a specific electronic device 852. Moreover, upon detection of at least one wireless charger (e.g., wireless charger 802; see FIG. 9), control system 704 may further be configured to implement a suitable charging scheme for the specific electronic device 852. More specifically, control system 704 may employ a charging analysis to determine, based on one or more factors, whether electronic device 852 should receive a charge from an available wireless charger. As noted above, a charging analysis may comprise, for example only, a cost benefit analysis wherein the cost of charging is weighed against the benefit of charging. Furthermore, in the event a plurality of wireless chargers are detected by control system 704, control system 704 may be configured to determine, based on one or more factors, which wireless charger of the plurality of identified wireless chargers should convey power to electronic device 852 to enable a charging scenario of device 852 to be optimized. Yet even more specifically, control system 704 may consider various factors associated with electronic device 852, with a user of electronic device 852, one or more available wireless chargers, or a combination thereof, and, in response thereto, may determine whether electronic device 852 should receive a charge and, if so, what wireless charger should be utilized to enable a charging scenario of electronic device 852 to be optimized.

According to one exemplary embodiment, control system 704 may be configured to, upon completion of a charging analysis, automatically implement a charging scheme for electronic device 852. According to another exemplary embodiment, upon completion of a charging analysis, control system 704 may be configured to provide a user of device 852 with a suggested charging scheme, which may be accepted or rejected by the user. It is noted that control system 704 may provide a device user with a list of detected wireless chargers. Moreover, control system 704 may provide the user with information about the detected wireless chargers, including location, cost, and speed of transmission. Based on the provided information, the user may select the desired wireless charger for charging. It is noted that according to one exemplary embodiment, control system 704 may be configured to delay charging until an electronic device user has selected a desired wireless charger.

Furthermore, control system 704 may be configured to employ one or more charging modes. As noted above, a charging mode may define a charging scheme, such as a "wireless charging mode," a "no-wireless charging mode," a "subscription based charging mode," or an "ad-based charging mode." Control system 704 may be configured to implement a specific charging mode based on several parameters, such as time, location, temporary preference, etc. According to another exemplary embodiment, control system 704 may be configured to automate exemplary features of the present invention. For example, control system 704 may be configured to employ a probabilistic and/or statistical-based analysis to automatically select a wireless charger or charging mode based on a user's prior decisions. Additionally, control system 704 may be configured to adapt an operational state of electronic device 852 to, for example, reduce power consumption of electronic device 852.

Moreover, according to one exemplary embodiment of the present invention, system 704 may be configured to synchronize with an electronic calendar associated with device 852 and, accordingly, control system 704 may predict power demands based on one or more electronic calendar entries. Moreover, according to another exemplary embodiment, control system 704 may be configured to modify (e.g., reduce) power consumption of device 852 in anticipation of one or more entries of an associated electronic calendar.

Figure 11:
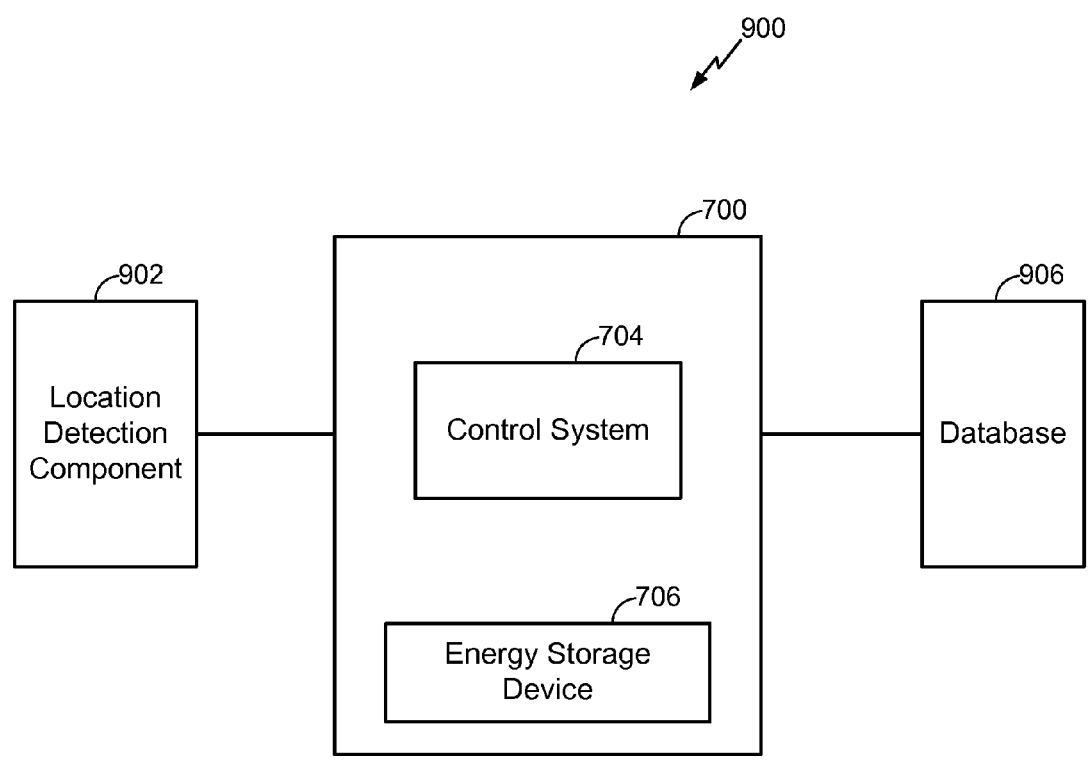
FIG. 11 depicts a location detection system, in accordance with an exemplary embodiment of the present invention.

As will be appreciated by a person having ordinary skill in the art, wireless power may have a limited range, and for mobile applications there is no guarantee that there will always be wireless charger available to charge from. Moreover, since wireless power fields may drop off quickly over distance, it may not always be possible for an electronic device (e.g., device 700) to detect a location of a wireless charger. FIG. 11 illustrates a location system 900 including control system 704, a database 906 and a location detection component 902. By way of example, location detection component 902 may comprise a GPS, an A-GPS, one or more inertial sensor, a WiFi system, a Bluetooth system, or any combination thereof. With reference to FIG. 11, in accordance with one or more exemplary embodiments of the present invention, control system 704 may comprise, or may have access to, database 906, which may include information (e.g., location based information) relating to wireless chargers. Additionally, control system 704 may comprise, or may be coupled to, location detection component 902, which may determine an absolute location of device 700. It is noted that although database 906 is illustrated as being positioned remote from device 700, the present invention is not so limited. Rather, device 700 may include database 906. Similarly, although location detection component 902 is illustrated as being positioned remote from device 700, the present invention is not so limited. Rather, device 700 may include location detection component 902.

Control system 704, using database 906 having data related to one or more wireless chargers, may provide a device user with a location and possibly directions to one or more wireless chargers. Furthermore, as noted above, control system 704 may be configured to locate new and/or unrecorded wireless chargers (e.g., via one or more proximity sensors) and, therefore, control system 704 may bookmark locations of the located wireless chargers in database 906 for future reference. Similarly, control system 704 may be configured to gather statistics about location and time, and learn preferred times to receive a charge. For example, if device 700 is moved in a regular pattern, control system 704 may be configured to learn how long device 700 is positioned in a charging region of each wireless charger and where device will be moving next. As another example, if device 700 is positioned within a charging region of a wireless charger, which is indicated in database as a fee-based charger, control system 704 may enable device to be charged only if device 700 lacks a sufficient amount of power to make it to the next free wireless charger. Statistics regarding location and time spent in wireless charger locations may also be used by third parties. Furthermore, third parties can provide targeted advertising to the user based on the statistics. Database 906 may also be updated by receiving information from popular geo-tagging applications and other web services.

According to another exemplary embodiment, control system 704 may be configured to use dead-reckoning, as will be understood by a person having ordinary skill in the art, to determine its location relative to one or more wireless chargers. As will be appreciated by a person having ordinary skill in the art, control system 704, using dead-reckoning, may still use database 906 for finding wireless chargers as well as for recording the discovery of new wireless chargers. Furthermore, in accordance with another exemplary embodiment, control system 704, upon determining a location of device 700, may request directions to a wireless charger. Moreover, in an exemplary embodiment wherein control system 704 is remote from device 700, device 700 may send control system 704 information in the form of, for example, one or more pictures which relate to a location, such as, for example, store signs. Based on this received information, and optionally other information (e.g. cell ID), and the direction the user is moving, control system 704 may be configured to identify locations of nearby wireless chargers.

Moreover, in an exemplary embodiment wherein device 700 comprises location detection component 902 and device 700 is being charged by a wireless charger, device 700 may determine its location and, thereafter, record a location of the wireless charger in database 906. It is noted that for this exemplary embodiment, it is assumed that device 700 and the wireless charger that device 700 is receiving wireless power from have the same location. In addition, because each device 700, which is receiving wireless power from a specific wireless charger, may send information to database 906 (e.g., which wireless charger device 700 is currently utilizing), database 906 may comprise information identifying how many devices are receiving power from the specific wireless charger at any one time. Accordingly, this may be useful in the context of determining whether to receive wireless power from the specific wireless charger or whether to locate another, less busy wireless charger. Furthermore, it is noted that a wireless charger may be configured to send information to database 906, wherein in the information may be related to, for example only, utilization of the wireless charger.

Figure 12:
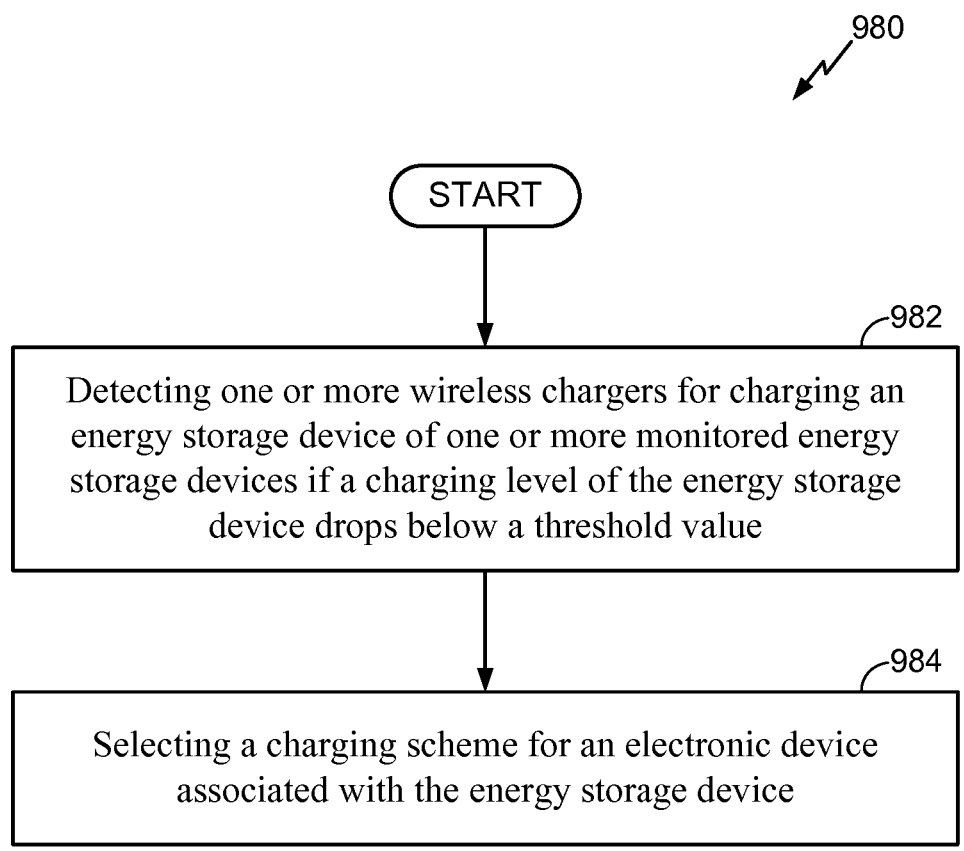
FIG. 12 is a flowchart illustrating a method, according to an exemplary embodiment of the present invention.

FIG. 12 is a flowchart illustrating a method 980, in accordance with one or more exemplary embodiments. Method 980 may include detecting one or more wireless chargers for charging an energy storage device of one or more monitored energy storage devices if the energy storage device drops below a threshold value (depicted by numeral 984). Furthermore, method 980 may include selecting a charging scheme for an electronic device associated with the energy storage device (depicted by numeral 986).

As will be appreciated by a person having ordinary skill in the art, indoor positioning using WiFi may typically require either registering received signal strength indication (RSSI) of beacons from access points and then looking up a RSSI to distance model, or sending packets actively to an access point and using time of arrival information to find the range. To enable positioning, such ranging techniques are applied along with the knowledge of the access point locations to perform multilateration, and determine a final position. One important challenge with indoor positioning is the lack of sufficient access points. Typically three non-collinear access points (APs) are required to be in range of a station (STA) to allow for accurate positioning. However in many deployments, the access points may be deployed less densely or their locations may not be known.

As will be understood by a person having ordinary skill in the art, wireless chargers may be positioned at indoor or outdoor locations, such as, for example only, in airports, on table tops (e.g., in a food court of a mall), in coffee shops, waiting rooms, etc., to service customers of the premises. According to various exemplary embodiments of the present invention, devices that are being charged by wireless chargers may be utilized to increase the number of beacon signals that can be used for ranging in outdoor or indoor environments. Accordingly, position accuracy may be improved.

Figure 13:
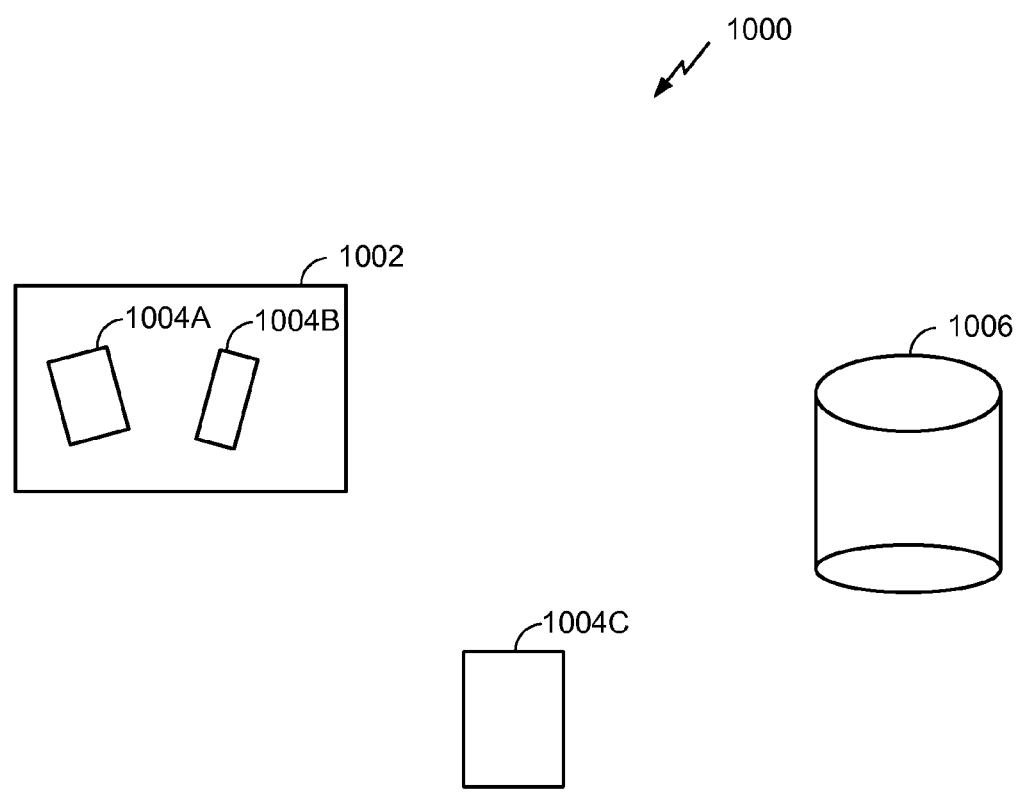
FIG. 13 illustrates a system including a wireless charger, in accordance with an exemplary embodiment of the present invention.

FIG. 13 illustrates a system 1000 including a wireless charger 1002 and a plurality of electronic devices 1004A, 1004B, and 1004C. As illustrated in FIG. 13 electronic devices 1004A and 1004B are positioned within a charging region of wireless charger 1002. System further includes a database 1006, as described more fully below. According to one exemplary embodiment, electronic device 1004C, which is in the vicinity of wireless charger 1002, is in need of a wireless charge.

A contemplated operation of system 1000 will now be described. Via an established communication link therebetween, wireless charger 1002 may be configured to transmit a charging tag to an electronic device positioned within an associated charging region. More specifically, wireless charger 1002 may be configured to transmit a charging tag to electronic device 1004A, electronic device 1004B, or both. According to one exemplary embodiment, a charging tag may comprise a unique identifier for wireless charger 1002. For example, the unique identifier may be similar to a MAC address, which identifies a wireless device. In this exemplary embodiment, the charging tag may be hard-coded into memory of wireless charger. According to another exemplary embodiment, a charging tag may comprise local or global coordinates identifying a location of wireless charger 1002. In this exemplary embodiment, the charging tag may be programmed into wireless charger 1002 via interface 1008.

Upon receipt of a charging tag, an electronic device (e.g., electronic device 1004A, electronic device 1004B, or both) may act as an access point by integrating the charging tag into a beacon signal, such as a WiFi beacon. As will be appreciated by a person having ordinary skill, WiFi beacons may contain additional information (e.g., a charging tag) either by encoding the charging tag into a SSID, a BSSID, or a beacon information element.

Furthermore, electronic device 1004C may receive a beacon signal transmitted by electronic device 1004A, electronic device 1004B, or both. With specific reference to the exemplary embodiment wherein the charging tag comprises a unique identifier, upon receipt of the beacon signal, electronic device 1004C may look up the associated charging tag in database 1006, which may comprise a mapping of unique identifiers to coordinates (e.g., either local or global coordinates). Thereafter, electronic device 1004C may range with the electronic device from which it received the beacon signal (e.g., either electronic device 1004A or electronic device 1004B) to determine its relative position. It is noted that it is assumed that the locations of wireless charger 1002 and electronic devices 1004A and 1004B are the same. Moreover, with specific reference to the exemplary embodiment wherein the charging tag comprises local or global coordinates, upon receipt of the beacon signal, electronic device 1004C may range with the electronic device from which it received the beacon signal (e.g., either electronic device 1004A or electronic device 1004B) using the location information included in received beacon signal to determine its relative position.

In accordance with another exemplary embodiment wherein the charging tag comprises an unique identifier, after receipt of a charging tag from wireless charger 1002, an electronic device positioned within a charging region of wireless charger 1002 (e.g., electronic device 1004A or 1004B) may look up the associated charging tag in database 1006, which, as noted above, may comprise a mapping of unique identifiers to coordinates (e.g., either local or global coordinates). Consequently, assuming that the electronic device (e.g., electronic device 1004A) has the same location as wireless charger 1002, the electronic device (e.g., electronic device 1004A) may determine its own location. Thereafter, the electronic device (e.g., electronic device 1004A) may beacon its location to any other electronic devices in need of positioning (e.g., electronic device 1004C). Accordingly, in this exemplary embodiment, electronic device 1004A may not be required to access database 1006. Upon receipt of a beacon signal from electronic device 1004A, electronic device 1004C may determine its relative position.

Figure 14:
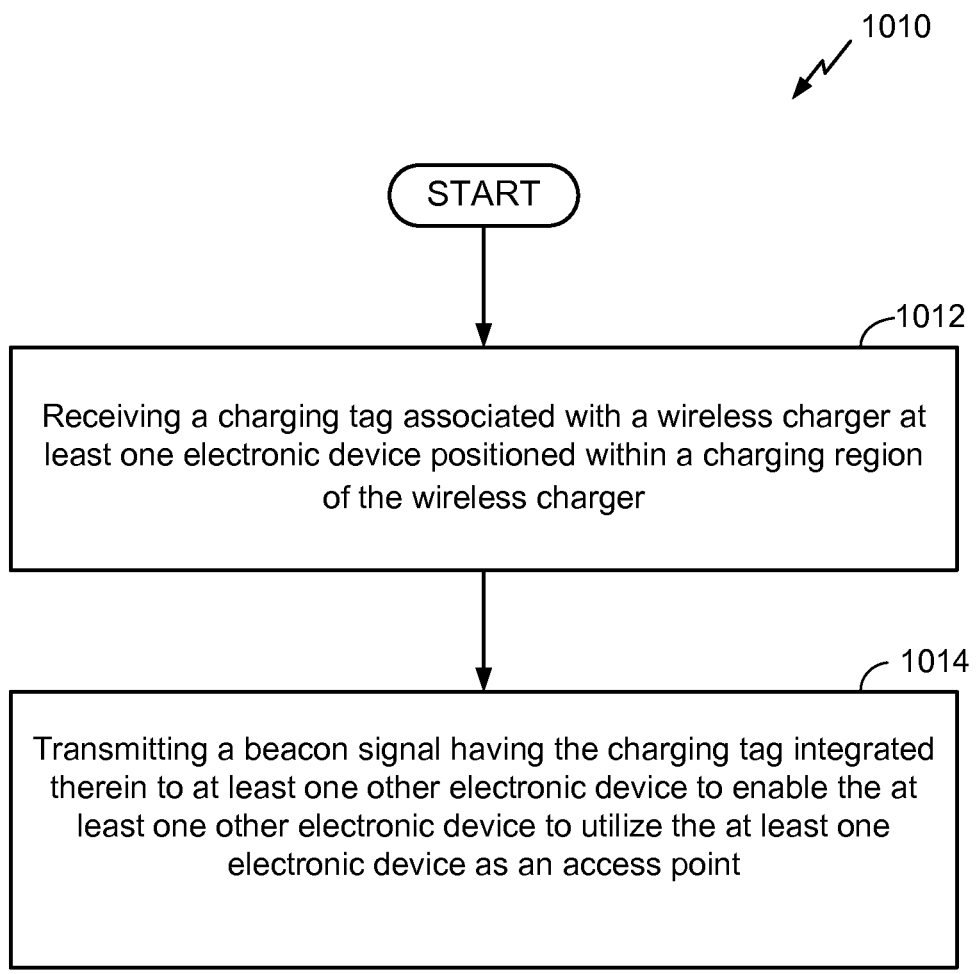
FIG. 14 is a flowchart illustrating another method, according to an exemplary embodiment of the present invention.

FIG. 14 is a flowchart illustrating a method 1010, in accordance with one or more exemplary embodiments. Method 1010 may include receiving a charging tag associated with a wireless charger at least one electronic device positioned within a charging region of the wireless charger (depicted by numeral 1012). Method 1010 may further include transmitting a beacon signal having the charging tag integrated therein to at least one other electronic device to enable the at least one other electronic device to utilize the at least one electronic device as an access point (depicted by numeral 1014).

The exemplary embodiments described above with reference to FIGS. 13 and 14 may utilize charging devices to dynamically increase a number of beacon signals or ranging devices in an environment. Therefore, positioning accuracy may be enhanced since an electronic device may range with one or more other electronic devices to enhance a position estimate.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method, comprising:
    detecting a plurality of wireless chargers within a detectable region;
    performing a charging analysis based on one or more factors associated with the plurality of wireless chargers; and
    automatically selecting, based on the charging analysis, a charging scheme for an electronic device, wherein automatically selecting comprises: i) determining whether to receive wireless power and, ii) upon detecting the plurality of wireless chargers, automatically determining from which wireless charger of the plurality of wireless chargers to receive the wireless power;
    wherein the charging analysis is further based on a charging speed of the plurality of detected wireless chargers and a level of charge of the electronic device.

2. The method of claim 1, wherein performing the charging analysis further comprises performing a power analysis on the electronic device after detecting the plurality of wireless chargers for charging an energy storage device associated with the electronic device.

3. The method of claim 2, wherein performing a power analysis comprises performing the power analysis based on one or more factors associated with at least one of the energy storage device and a user of the electronic device.

4. The method of claim 2, wherein performing a power analysis comprises performing the power analysis based on one or more factors comprising at least one of an amount of charge required by the electronic device, an operational state of the electronic device, a cost of charging the electronic device, a benefit of charging the electronic device, one or more delays associated with charging the electronic device, reliability issues associated with the plurality of wireless chargers, an expected length of time for charging the electronic device, an expected time until a subsequent charge of the electronic device, a power demand of the electronic device, whether the plurality of wireless chargers require a surcharge, or one or more applications being employed by the electronic device.

5. The method of claim 1, wherein detecting the plurality of wireless chargers comprises determining a location of the plurality of wireless chargers with a location detection system.

6. The method of claim 1, wherein selecting a charging scheme for an electronic device comprises selecting a charging scheme based on one or more entries of a time management application of the electronic device.

7. The method of claim 1, wherein detecting the plurality of wireless chargers comprises detecting the plurality of wireless chargers with one or more proximity sensors.

8. The method of claim 1, further comprising displaying a list of the plurality of wireless chargers comprising information associated with at least one of the plurality of wireless charger.

9. The method of claim 1, wherein displaying a list of the plurality of wireless chargers comprises displaying at least one of a location of the plurality of wireless chargers, a charging mode of the plurality of wireless chargers, and a transmission speed of the plurality of wireless chargers.

10. The method of claim 1, further comprising adjusting an operational state of the electronic device up the energy storage device associated therewith dropping below a threshold value.

11. The method of claim 1, wherein selecting a charging scheme for the electronic device comprises selecting one of a wireless charging mode, a no-wireless charging mode, a subscription-based charging mode, or an ad-based charging mode.

12. The method of claim 1, further comprising monitoring a level of charge of a plurality of energy storage devices from a remote server-based device.

13. The method of claim 1, wherein the level of charge of the electronic device comprises a level of charge of an energy storage device associated with the electronic device, the method further comprising monitoring the level of charge of the energy storage device associated with the electronic device with a control system of the electronic device.

14. The method of claim 1, wherein automatically selecting the charging scheme further comprises selecting the charging scheme based on at least one of one or more user-defined parameters or a user's prior decisions.

15. The method of claim 1, further comprising synchronizing a calendar application with the electronic device.

16. The method of claim 15, further comprising modifying power consumption of the electronic device in anticipation of one or more entries of the calendar application.

17. The method of claim 1, wherein detecting the plurality of wireless chargers is based at least in part on a comparison of a charging level of an energy storage device with a threshold value, the energy storage device being associated with the electronic device.

18. The method of claim 2, wherein performing a power analysis comprises performing the power analysis based on a cost of charging the electronic device and a benefit of charging the electronic device.

19. The method of claim 1, further comprising:
predicting power demands of the electronic device,
wherein the detecting the plurality of wireless chargers is performed based on the predicted power demands of the electronic device.

20. The method of claim 1, wherein the charging analysis is further based on whether the electronic device is stationary or in motion.

21. A device, comprising:
a detector configured to detect a plurality of wireless chargers within a detectable region; and
a control system configured to:
perform a charging analysis based on one or more factors associated with the plurality of wireless chargers; and
automatically select, based on the charging analysis, a charging scheme for an electronic device, wherein automatically selecting comprises: i) determining whether to receive wireless power and, ii) upon detecting the plurality of wireless chargers, automatically determining from which wireless charger of the plurality of wireless chargers to receive the wireless power,
wherein the charging analysis is further based on a charging speed of the plurality of detected wireless chargers and a level of charge of the electronic device.

22. The device of claim 21, wherein the electronic device comprises a wireless power receiver having at least one receive antenna.

23. The device of claim 21, wherein the device comprises a server-based device remote from the electronic device.

24. The device of claim 21, wherein the control system is further configured to perform a power analysis on the electronic device.

25. The device of claim 21, wherein the control system is configured to select the charging scheme based on at least one factor associated with at least one of the energy storage device, the electronic device, and a user of the electronic device.

26. The device of claim 21, wherein the control system is further configured to access a database comprising information concerning the plurality of wireless chargers.

27. The device of claim 21, wherein the control system comprises a global positioning system for determining a location of an associated electronic device.

28. The device of claim 21, wherein the control system is further configured to display a list of the plurality of wireless chargers comprising information associated with at least one of the plurality of wireless charger.

29. The device of claim 21, wherein the control system is further configured to select one of a wireless charging mode, a no-wireless charging mode, a subscription-based charging mode, or an ad-based charging mode.

30. The device of claim 21, wherein the control system is configured for automated operation.

31. The device of claim 21, wherein the control system comprises one or more user-programmable parameters.

32. The device of claim 21, wherein the control system is configured to synchronize with a time management application of an electronic device.

33. The device of claim 21, wherein the control system is configured to select a charging scheme of the electronic device based on one or more entries of the time management application.

34. The device of claim 21, wherein the control system is configured to provide one or more of a user of the electronic device and at least one other electronic device with a location of the plurality of wireless chargers.

35. The device of claim 21, wherein the control system is configured to indicated a need for additional power.

36. A device, comprising:
- means for detecting a plurality of wireless chargers within a detectable region;
- means for performing a charging analysis based on one or more factors associated with the plurality of wireless chargers;
- means for automatically selecting, based on the charging analysis, a charging scheme for an electronic device, wherein automatically selecting comprises: i) determining whether to receive wireless power and, ii) upon detecting the plurality of wireless chargers, automatically determining from which wireless charger of the plurality of wireless chargers to receive the wireless power,
- wherein the charging analysis is further based on a charging speed of the plurality of detected wireless chargers and a level of charge of the electronic device.

37. A non-transient computer readable media having instructions stored thereon that cause a wireless power transferring apparatus to perform a method of:
- detecting a plurality of wireless chargers within a detectable region;
- performing a charging analysis based on one or more factors associated with the plurality of wireless chargers; and
- automatically selecting, based on the charging analysis, a charging scheme for an electronic device, wherein automatically selecting comprises: i) determining whether to receive wireless power and, ii) upon detecting the plurality of wireless chargers, automatically determining from which wireless charger of the plurality of wireless chargers to receive the wireless power,
- wherein the charging analysis is further based on a charging speed of the plurality of detected wireless chargers and a level of charge of the electronic device.

38. A method comprising:
- detecting a plurality of wireless chargers within a detectable region;
- performing a charging analysis based on one or more factors associated with the plurality of wireless chargers, the charging analysis including:
  - receiving characteristic information of the plurality of wireless chargers from a database, the characteristic information including a location for each of the plurality of wireless chargers;
  - detecting a wireless charger having characteristic information not stored in the database; and
  - storing, in the database, the characteristic information including a location of the detected wireless charger having characteristic information not stored in the database; and
- automatically selecting, based on the charging analysis, a charging scheme for an electronic device, wherein automatically selecting comprises: i) determining whether to receive wireless power and, ii) upon detecting the plurality of wireless chargers, automatically determining from which wireless charger of the plurality of wireless chargers to receive the wireless power.

* * * * *